Jan. 29, 1963 C. R. WILHELMSEN 3,075,701
BINARY ADDING CIRCUIT
Filed Feb. 24, 1960 2 Sheets-Sheet 1

| SERIAL SIGNALS A | SERIAL SIGNALS B | CARRY STATUS | CONTROL SIGNALS 20a | 20b | 20c | 20d | SUM SIGNAL S |
|---|---|---|---|---|---|---|---|
| 0 | + 0 | NC | −B | −B | gnd | gnd | = 0 |
| 0 | + 1 | NC | gnd | −B | gnd | gnd | = 1 |
| 1 | + 1 | NC → C | gnd | gnd | −B | −B | = 0 |
| 1 | + 0 | C | gnd | −B | −B | gnd | = 0 |
| 1 | + 1 | C | gnd | gnd | −B | gnd | = 1 |
| 0 | + 0 | C → NC | −B | −B | gnd | + B | = 1 |

United States Patent Office 3,075,701
Patented Jan. 29, 1963

3 075,701

BINARY ADDING CIRCUIT

Carl R. Wilhelmsen, Huntington Station, N.Y., assignor to Hazeltine Research, Inc., a corporation of Illinois Filed Feb. 24, 1960, Ser. No. 10,642
7 Claims. (Cl. 235—176)

This invention relates to a binary adding circuit and, in particular, to a serial type full adder which controls, by means of a novel control arrangement, the translation of selected clock pulses to make up the desired sum signal.

The adding circuit is the basic unit of a computer since, with proper programming, all arithmetic processes may be performed using an adding circuit along with any additional circuits required for the particular process being performed. This being the case, and since many separate adding circuits may be built into a computer, constant attention is directed to the design of the circuit so as to make it cheaper and more reliable in its operation.

A full adder is one which has three inputs, two of which are used for supplying digital pulse signals representing binary numbers to be added, and a third of which is used for supplying the carry signal. From these three inputs, a full adder is capable of determining the sum of the three signals and whether or not a further carry signal is required. A serial adder is one to which each digital signal representative of a binary number is supplied on one input line with the digital pulses occurring in a time sequence which may begin with the least significant digit and range up to the most significant digit. The serial adder then produces the output sum signal on a single line with the digital pulses occurring in a time sequence corresponding to that of the input signals.

In serial operation some means must be provided for holding the carry signal occurring in any given order so that it may be used in the addition occurring at the next higher order. The use of delay lines has been proposed for this purpose but has been found to be generally unsatisfactory. Alternatively, additional synchronizing circuitry has been incorporated in the adder to improve its performance. Such an arrangement usually requires that various synchronizing signals in addition to the usual periodic clock pulses be supplied to the circuit. This, however, makes the adder more expensive and makes other types of circuits which can generate and hold their own carry signal for use in the next higher binary order more desirable.

Accordingly, it is an object of the present invention to provide a new and improved binary adding circuit of the serial full adder type which avoids one or more of the aforementioned disadvantages.

It is also an object of the present invention to provide a simple and inexpensive adding circuit with improved operational reliability.

Further, it is an object of the present invention to provide a binary adding circuit which does not require a carry signal input and which utilizes a novel control arrangement to translate selected periodic pulses to make up the sum signal.

A still further object of the present invention is to provide a novel control arrangement in a binary adding circuit which simplifies the construction and operation of the circuit.

In accordance with the present invention, there is provided a binary adding circuit for adding two serial signals representative of binary numbers to produce, by the translation of selected ones of a train of periodic pulses, a sum signal representative of the sum of the binary numbers which comprises means for supplying the serial signals and a source of periodic pulses synchronous with the period of digital pulses in such serial signals. The adding circuit also comprises control means responsive to the serial signals for developing predetermined combinations of gating control signals including first means for developing a control signal of a first type during the occurrence of a digital pulse in either one of the serial signals and otherwise developing a control signal of a second type. The control means also includes second means for developing a control signal of the first type during the simultaneous occurrence of digital pulses in both of the serial signals and otherwise developing a control signal of the second type. Further included in the control means is carry status indicating means including a bistable circuit coupled to the first and second means and for developing a control signal of the first type during a no-carry status indication and of the second type during a carry status indication. Finally, the control means includes third means coupled to the indicating means for developing a control signal effectively equivalent to the second type in response to the change from no-carry to carry status and for developing a control signal effectively equivalent to two signals of said first type in response to a change from carry to no-carry status. The adding circuit also comprises gating means coupled to the periodic pules source and responsive to the control signals for translating the periodic pulses whenever the ratio of the number of the first type of control signals to the second type of control signals differs in one sense from a predetermined amount.

For a better understanding of the present invention, together with other and further objects thereof, reference is had to the following description, taken in connection with the accompanying drawings, and its scope will be pointed out in the appended claims.

Referring to the drawings.

Figures 1, 2:
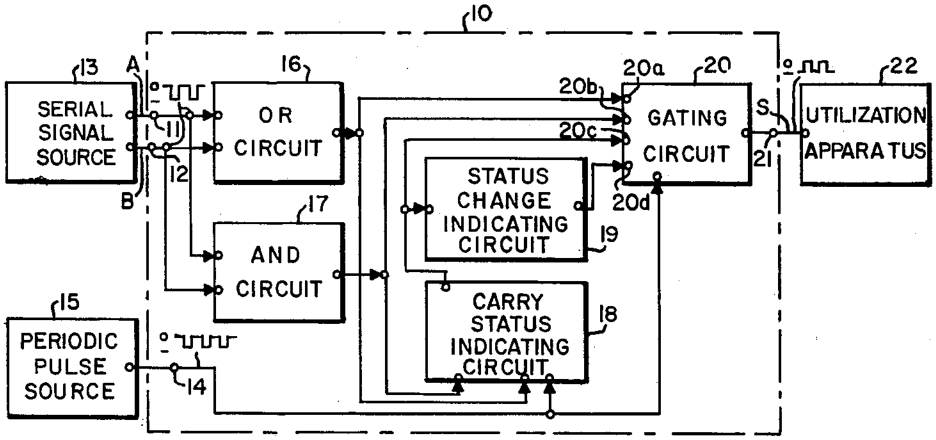
FIG. 1 is a logic diagram of an arrangement utilizing a binary adding circuit constructed in accordance with the present invention.
FIG. 2 is a chart useful in explaining the novel control logic of the FIG. 1 adding circuit.

*Description of FIG. 1 Adding Circuit*

Referring now more particularly to FIG. 1, there is shown therein a logic diagram of an arrangement utilizing a binary adding circuit 10 constructed in accordance with the present invention for adding two signals representative of binary numbers to produce, by the translation of selected ones of a train of periodic pulses, a sum signal representative of the sum of the two numbers. Adding circuit 10 comprises means including terminals 11 and 12 coupled to source 13 for supplying two serial signals "A" and "B," each representative of binary numbers to be added. Source 13 may include a push-button or card-reading input device coupled, for example, to terminal 11 and a computer magnetic storage drum coupled to terminal 12, both of which are of conventional construction. Means for supplying periodic pulses synchronous with the period of digital pulses in signals "A" and "B" includes terminal 14 coupled to a source 15 of such pulses which may comprise a conventional periodic pulse generator usually found in the timing section of the computer from which signals "A" and "B" are supplied. Any convenient pulse form and repetition frequency may be used for the signals "A" and "B" and for the periodic pulses, provided their respective digital pulse positions are maintained in substantially synchronous relation, for example, the pulses may be negative-going pulses of −20 volts riding on a quiescent ground potential and may be about 180 microseconds wide with a pulse repetition frequency of 2,000 pulses per second.

The adding circuit also comprises control means responsive to signals "A" and "B" and to the periodic pulses for developing therefrom predetermined combinations of gating control signals. The control means includes first means such as OR circuit 16 for developing a control signal of a first type, for example, of ground potential, during the occurrence of a digital pulse in either one of signals "A" or "B" and otherwise developing a control signal of a second type, for example, a negative potential −B. The control means also includes second means such as AND circuit 17 for developing a control signal of the one type, ground potential, during the simultaneous occurrence of digital pulses in both of signals "A" and "B" and otherwise developing a control signal of the second type, negative potential −B. It can be seen that for the particular types of control signals selected for use in adding circuit 10, the control signals are inverted forms of signals "A" and "B" after appropriate AND and OR operations. Thus there is an inherent inverting operation in each of the circuits 16 and 17 which must be considered in the over-all construction of adding circuit 10 but which is not necessary to be included in the design of all adding circuits constructed in accordance with the present invention. Particular circuits for performing this function will be described subsequently in connection with FIG. 3 along with circuits for the remaining units in adding circuit 10.

The control means also includes carry status indicating circuit 18 including a bistable circuit coupled to the first and second means and to the periodic pulse source for developing a control signal of the foregoing first type during a no-carry status indication and of the foregoing second type during a carry status indication. This may be accomplished by rendering the bistable circuit in circuit 18 responsive to the first type control signal from AND circuit 17 to change to a carry status if not already therein and to a periodic pulse during the simultaneous absence of digital pulses in signals "A" and "B" to change to a no-carry status if not already therein. The control means finally includes third means such as status change indicating circuit 19 for developing at the output thereof a control signal effectively equivalent to the second type control signal in response to a change from no-carry to carry status and for developing a control signal effectively equivalent to two signals of the foregoing one type in response to a change from carry to no-carry status. That is to say, when circuit 18 changes from no-carry to carry status, circuit 19 develops a control signal which has the same effect as though a single control signal actually of the second type had been added to the group of control signals and, when circuit 18 changes from carry to no-carry status, circuit 19 develops a control signal which has the effect of appropriately reducing the over-all ratio of negative potential control signals to ground potential control signals thereby to permit translation of a periodic pulse. This can be done with a single control signal by means of current control as in the FIG. 3 adding circuit or with two control signals by actually developing two ground potentials as in the FIG. 4 adding circuit.

Adding circuit 10 finally comprises a gating circuit 20 coupled to the periodic pulse source at terminal 14 and responsive to the control signals at the input terminals **20*a*–20*d*, for translating the desired periodic pulses which go to make up the sum signal whenever the ratio of the number of the one type control signals to the second type control signals at terminals 20*a*–20*d* differs in one sense from a predetermined amount, for example, greater than one. Therefore, gating circuit 20 may be adapted to translate a periodic pulse from source 15 whenever the number of terminals 20*a*–20*d* at ground potential exceeds the number of those terminals at the negative potential −B. The pulses translated by gating circuit 20 then appear at output terminal 21 as positive-going pulses which are coupled to utilization apparatus 22** comprising, for example, a recording head associated with a magnetic storage drum.

*Operation of Adding Circuit 10 of FIG. 1*

In considering the operation of adding circuit 10, reference will be made to FIG. 2 wherein the condition of adding circuit 10 is shown for six combinations of serial signals "A" and "B" and the carry and no-carry status indications. In accordance with the conventional rules of binary addition, these are the only six combinations possible in any problem in addition. In FIG. 2 a "0" indicates the absence of a digital pulse in signals "A" and "B" and in the sum signal "S," while a "1" indicates the presence of such a pulse. In the colunm headed "Carry Status" the symbol "NC" represents the existence of a no-carry status indication from circuit 18, the symbol "C" represents a carry status indication, while the symbols "NC→C" and "C→NC" represent changes in the status indication from an initial no-carry status to a final carry status and from an initial carry status to a final no-carry status, respectively. The remaining columns indicate the condition of the control signals at terminals **20*a*–20*d*. For example, in the first row of the chart terminals 20*a* and 20*b* each have a control signal of the second type, −B, applied thereto and terminals 20*c* and 20*d*** each have the first type control signal, *gnd*, applied thereto.

In accordance with the present invention, adding circuit 10 operates to translate a periodic pulse through gating circuit 20 whenever those terminals **20*a*–20*d* to which a ground potential is applied exceed the terminals having a negative potential applied. Thus, where there are only four control terminals, as in the FIG. 1 adding circuit, the occurrence of more than two grounded terminals will ensure the translation of a pulse. Conversely, the occurrence of two negative terminals ordinarily will cause gating circuit 20 to prevent the translation of a pulse. The one exception to this latter rule will be considered in connection with the operation of adding circuit 10** in the case of change from carry to no-carry status indication.

Referring now to the first row of the FIG. 2 chart, the operation of adding circuit 10 will be considered where there is a simultaneous absence of digital pulses in signals "A" and 'B." In this case, the controls from circuits 16 and 17 applied to terminals **20*a* and 20*b*, respectively, are both negative. While this is also true during the intervals between digital pulses, the following discussion will be concerned only with the condition of adding circuit 10 during the period synchronous with the occurrence of a periodic pulse of terminal 14. Assuming carry status indicating circuit 18 to have been initially in the no-carry status as it normally would be at the beginning of an adding cycle, the output thereof at terminal 20*c* is at ground potential. There being no change in status, circuit 19 is ineffective to produce any control signal indicating such a change. Thus the existence of the two negative terminals 20*a* and 20*b* ensures the prevention of the translation of a periodic pulse since circuits 18 and 19 do not develop the necessary number of ground potentials to override the effect of the two negative terminals. In the second row of the chart the condition of adding circuit 10 is shown during the occurrence of a digital pulse in only one of signals "A" or "B," in this case signal "B," where circuit 18 is initially in the no-carry status. The conditions within adding circuit 10 are the same as in row 1 of the chart except that the occurrence of a single digital pulse causes OR circuit 16 to develop a ground potential at terminal 20*a*. There is now an excess of two ground terminals over the single negative terminal 20*b* thus permitting gating circuit 20** to translate a periodic pulse therethrough.

During the occurrence of digital pulses in both of signals "A" and "B," circuits 16 and 17 develop ground potentials at both terminals 20*a* and 20*b*. Since, in this instance, it is desired to prevent the translation of a pulse, terminals 20*c* and 20*d* must both be negative. This is accomplished by making circuit 18 responsive to the output of AND circuit 17 to change to a carry status, thus developing a negative potential at terminal 20*c*. Circuit 19 responds to the change from no-carry to carry status to develop a control signal at terminal 20*d* effectively equivalent to a negative potential, thereby overcoming the effect of the two grounded terminals and preventing translation of the pulse through gating circuit 20.

The operation of adding circuit 10 where the circuit is initially in the carry status as illustrated in rows 4 and 5 of the chart is essentially the same as where the circuit is initially in the no-carry status. However, the last row of the chart illustrates the exception in the case of four control terminals where the occurrence of two negative terminals does not ensure the prevention of the translation of a periodic pulse. Thus, where there is a simultaneous absence of digital pulses in signals "A" and "B" and circuit 18 is initially in the carry status, the circuits 16 and 17 develop negative potentials at terminals 20*a* and 20*b* as expected and circuit 18 responds to the output of OR circuit 16 and the periodic pulse to change from a carry to a no-carry status, thus providing a ground potential at terminal 20*c*. The burden is now on circuit 19 to provide, at terminal 20*d*, a control signal which, in conjunction with the signal at terminal 20*c*, will override the pulse translation preventive effect of the two negative terminals 20*a* and 20*b*. It does this by developing a control signal equivalent to two ground potentials thus providing the excess of ground potentials required to permit gating circuit 20 to translate a periodic pulse.

A review of the conditions illustrated in the chart of FIG. 2 will show that adding circuit 10 properly operates under the conventional rules of serial binary addition to produce at the output thereof a serial signal representative of the sum of the two numbers represented by serial signals "A" and "B."

Figure 3:
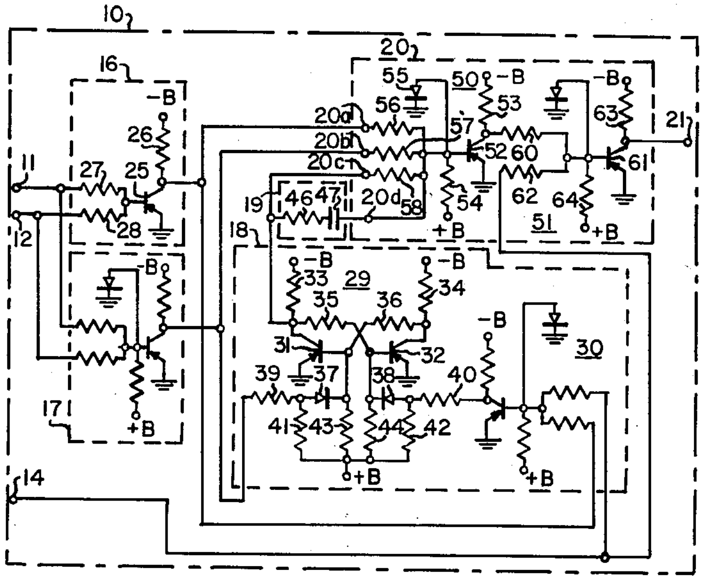
FIG. 3 is a detailed circuit diagram of a representative embodiment of the binary adding circuit in FIG. 1.

*Description of FIG. 3 Adding Circuit*

Referring now to FIG. 3, there is shown therein representative current controlled circuits capable of performing the functions described in connection with the adding circuit of FIG. 1. In particular, the adding circuit 10 includes an OR circuit 16 comprising transistor 25 having its emitter connected directly to ground and its collector coupled through a resistor 26 to a potential source —B. The base of transistor 25 is coupled through input resistors 27 and 28 to serial signal supply terminals 11 and 12. Transistor 25, which may be of the PNP type, is biased by the serial signals at terminals 11 and 12 to be nonconductive in the absence of the occurrence of digital pulses in either of signals "A" or "B," thereby causing negative potential —B to appear at the output of OR circuit 16. The peak amplitude of the negative-going digital pulses in either one of signals "A" or "B" is preferably of a value sufficient to render transistor 25 conductive to a saturated condition thereby causing the ground potential from the emitter to appear at the output thereof. Adding circuit 10 also includes AND circuit 17 having a transistor circuit therein of a type to be described more fully hereinafter in connection with gating circuit 20. It will be enough here to note that the parameters of circuit 17 are selected to maintain the transistor therein normally nonconductive thereby causing a negative potential —B to appear at the output thereof except during the simultaneous occurrence of digital pulses in both of signals "A" and "B" when the transistor is rendered conductive to a saturated condition, thereby causing a ground potential to appear at the output of circuit 17.

Adding circuit 10 also includes carry status indicating circuit 18 having a bistable circuit 29, one input of which is coupled to the output of AND circuit 17, and the other input of which is coupled through AND circuit 30 to the output of OR circuit 16 and to periodic pulse supply terminal 14. Bistable circuit 29 is of conventional construction and has two stable states. In the first, wherein the circuit is representative of a no-carry status, transistor 31 is fully conductive, the base thereof being slightly negative, and transistor 32 is non-conductive, the base thereof being approximately at ground potential. In the second state, representative of a carry status, transistor 31 is nonconductive and transistor 32 is fully conductive, the polarities of their respective bases having been reversed. Diodes 37 and 38 serve to render circuit 29 responsive to change states only in response to the positive-going pulses from AND circuit 17 and AND circuit 30. The pulses from AND circuit 17, therefore, cause transistor 31 to become nonconductive thereby causing bistable circuit 29 to change to the carry status if initially in the no-carry status. AND circuit 30 may be of the same design as AND circuit 17 and serves as an inhibitor circuit to develop an output pulse in response to a periodic pulse except when the output of OR circuit 16 is at ground potential, and therefore produces an output pulse only during the simultaneous absence of digital pulses in signals "A" and "B." This pulse is translated through diode 38 to render transistor 32 nonconductive if initially in the conductive state thereby changing bistable circuit 29 to a no-carry status if not already therein. In this way, the potential at the collector of transistor 31 is caused to vary between ground and essentially —B.

Adding circuit 10 in FIG. 3 also includes status change indicating circuit 19 which consists simply of a differentiating circuit comprising resistor 46 and capacitor 47 coupled between the collector of transistor 31 and terminal 20*d*. As will be seen, a differentiating circuit is used because of its capability for the conduction of current in either direction depending on the nature of the status change. Preferably the parameters of circuit 19 are chosen to provide a time constant sufficiently long so that it will conduct at least a predetermined amount of current for the duration of occurrence of a periodic pulse at terminal 14.

The gating circuit 20 of adding circuit 10 includes a pair of AND circuits 50 and 51 responsive to the periodic pulses at terminal 14 and control signals at terminals 20*a*–20*d* to translate selected ones of the periodic pulses to form the sum signal. Circuit 50 includes transistor 52 having its emitter electrode coupled directly to ground and its collector electrode coupled through resistor 53 to a source of negative potential —B. A positive potential source +B is coupled through resistor 54 to the base of transistor 52 which, in turn, is coupled to ground through diode 55. Diode 55 is connected in a manner to conduct current therethrough whenever the potential at the base of transistor 52 seeks to rise above ground. The base of transistor 52 is further coupled through resistors 56, 57, and 58 to terminals 20*a*, 20*b*, and 20*c*, respectively, and through capacitor 47 to terminal 20*d*. It is desired to render the control of transistor 52 purely one of current control with the base thereof maintained substantially at ground potential throughout all the various control conditions. This is done by preferably selecting the values of each of resistors 56, 57, and 58 to be equal to the value of resistor 54. Thus when potential —B is applied to one of the terminals the current which flows therethrough is equal to the current flowing through resistor 54 and is actually supplied therefrom. When potential —B is applied to an additional terminal an additional amount of current equal to that already flowing occurs since the total effective resistance of the two resistors, being in parallel, is exactly one-half. This additional current is drawn from the base of transistor 52 through its grounded emitter. Since any of these currents which flow is always of a fixed predetermined amount, the currents flowing through each branch may be referred to as "units" of current regardless of their actual amounts. Circuits 17 and 30, as previously mentioned, may be of the some construction as circuit 50 with the single exception of having only two input circuit branches.

The collector of transistor 52 from which the output of circuit 50 is taken is coupled through resistor 60 of transistor 61 in circuit 51. Terminal 14 is coupled through resistor 62 to the base of transistor 61. The design of circuit 51 may be the same as circuit 50 or the circuit parameters may be varied slightly to permit adding circuit 10 to drive a magnetic recording head.

*Operation of FIG. 3 Adding Circuit*

In operation, transistor 52 is normally maintained fully conductive, i.e. when there are no input signals "A" and "B." This condition is illustrated in the first row of the FIG. 2 chart wherein the two negative terminals 20*a* and 20*b* cause a unit of current to flow through each of resistors 56 and 57, respectively. One of these current units is supplied from potential source +B through resistor 54. The other current unit, since resistor 54 can translate only a single unit of current, is supplied from the base of transistor 52, thus causing transistor 52 to be fully conductive thereby applying ground potential from the emitter thereof to resistor 60 of circuit 51. The existence of ground potential at resistor 60 causes circuit 51 to prevent the translation of a pulse therethrough since circuit 51, like circuit 50 and AND circuit 17, requires a negative potential at both inputs to cause the associated transistor to change its state of conduction.

During the occurrence of a digital pulse in serial signal "B" as in the second row of the FIG. 2 chart, only terminal 20*b* has a negative potential applied thereto, thus causing only one unit of current to be drawn from circuit 50. This unit of current is supplied from potential source +B through resistor 54 and no current is drawn from the base of transistor 52, thereby causing transistor 52 to be nonconductive. At this time, potential −B is applied to resistor 60 which now enables circuit 51 to translate a periodic pulse.

During the occurrence of a digital pulse in both of signals "A" and "B," both terminals 20*a* and 20*b* are at ground potential and no units of current flow through resistors 56 and 57. However, as previously explained, terminal 20*c* is negative and a unit of current is drawn from circuit 50 through resistor 58, this unit of current being supplied through resistor 54. Circuit 19 responds to the change in status indication to draw from circuit 50 an amount of current at least equal to the foregoing unit of current during the appearance of periodic pulse at terminal 14. This current through terminal 20*d* must be supplied by the base of transistor 52 thereby rendering the transistor fully conductive, which in turn prevents the appearance of a pulse at output terminal 21.

The operation of adding circuit 10 is essentially the same for the conditions shown in the fourth and fifth rows of the chart.

As shown in the last row of the chart, when circuit 18 is initially in the carry status and there are no digital pulses in signals "A" and "B," terminals 20*a* and 20*b* are both negative, thus drawing a unit of current through each of resistors 56 and 57. Circuit 29 changes status thus causing a ground potential to appear at terminal 20*c* to prevent the drawing of a unit of current through resistor 58. Circuit 19 responds to this change in status indication to supply at least a unit of current to circuit 50. There are now two units of current being drawn from circuit 50 but there are also two units of current being supplied to current 50, that is, through circuit 19 and resistor 54, and therefore no current is being drawn from the base of transistor 52. This causes transistor 52 to be nonconductive and the negative potential −B applied to resistor 60 permits the translation of a periodic pulse through circuit 51.

While applicant does not wish to be limited to any particular set of circuit constants, the following have proved useful in a binary adding circuit as represented in FIG. 3.

| | |
|---|---|
| Resistor 26 | 1.2 K ohms. |
| Resistor 27 | 22 K ohms. |
| Resistor 28 | 22 K ohms. |
| Resistor 33 | 1.2 K ohms. |
| Resistor 34 | 1.2 K ohms. |
| Resistor 35 | 22 K ohms. |
| Resistor 36 | 22 K ohms. |
| Resistor 41 | 22 K ohms. |
| Resistor 42 | 22 K ohms. |
| Resistor 43 | 220 K ohms. |
| Resistor 44 | 220 K ohms. |
| Resistor 46 | 4.7 K ohms. |
| Capacitor 47 | 0.026 Microfarad. |
| Resistor 53 | 1.2 K ohms. |
| Resistor 54 | 22 K ohms. |
| Resistor 56 | 22 K ohms. |
| Resistor 57 | 22 K ohms. |
| Resistor 58 | 22 K ohms. |
| Resistor 60 | 10 K ohms. |
| Resistor 62 | 10 K ohms. |
| Resistor 63 | 10 K ohms. |
| Resistor 64 | 10 K ohms. |
| Potential Source +B | +25 Volts. |
| Potential Source −B | −25 Volts. |
| All Diodes | 1N34A. |
| All Transistors | 2N109. |

Figure 4:
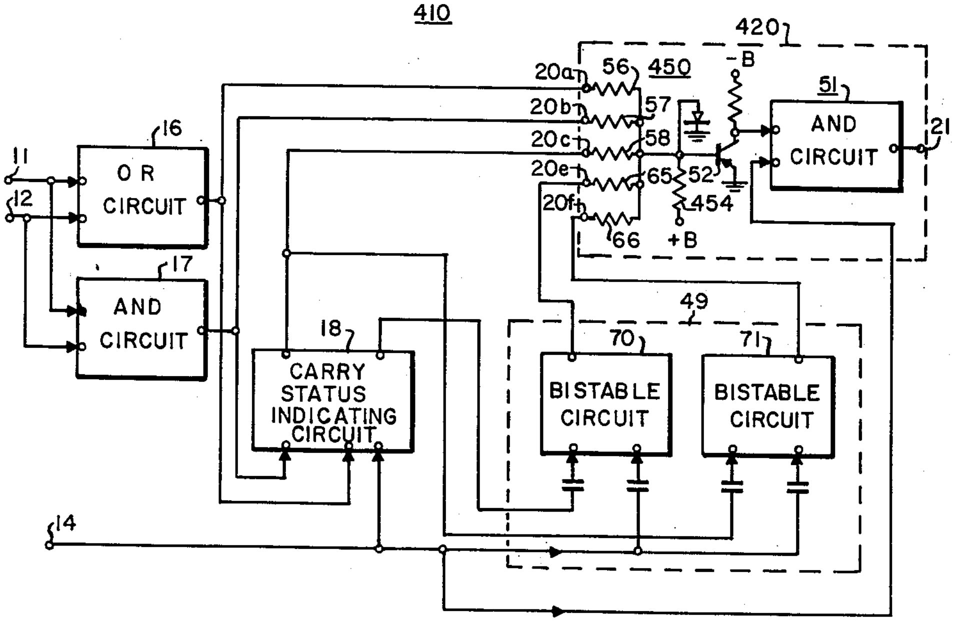
FIG. 4 is a circuit diagram illustrating a possible modification of a portion of the FIG. 1 adding circuit.

*Description and Operation of Adding Circuit of FIG. 4*

In adding circuit 10 of FIG. 3 the parameters of the differentiating circuit in circuit 19 are selected relative to a fixed width and timing of the periodic pulses at terminal 14. While the adding circuit has been found to operate quite well with this arrangement it does not allow for the use of a variable pulse width or changes in timing. An adding circuit operative in the presence of such variations will now be described with reference to FIG. 4. There is shown therein an adding circuit 410, in which units 16, 17, and 18 are preferably identical to those of adding circuit 10 of FIG. 3 both in construction and operation. Gating circuit 420 is similar to gating circuit 20 of FIG. 3 with one slight modification required by the use of status change indicating circuit 49.

In adding circuit 410 the control means includes, in addition to OR circuit 16, AND circuit 17, and carry status indicating circuit 18, a status change indicating circuit 49 responsive to a change in the status indication of circuit 18 from no-carry to carry status to develop a pair of negative potential control signals and responsive to a change in the status indication from carry to no-carry status to develop a pair of ground potential control signals. Circuit 49 preferably includes a pair of bistable circuits 70 and 71 identical in construction and operation to bistable circuit 29 in FIG. 3. The left-hand output side of bistable circuit 70 is coupled to terminal 20*e* of gating circuit 420 and is normally at ground potential in the absence of a change in status indication. The right-hand output side of bistable circuit 71 is coupled to terminal 20*f* and is normally at negative potential −B in the absence of a change in status indication. The left and right output sides of the bistable circuit in circuit 18 are coupled through differentiating capacitors to the left-hand input sides of circuits 70 and 71, respectively. The periodic pulses from terminal 14 are coupled to the right-hand input sides of circuits 70 and 71.

In gating circuit 420, circuit 450 is modified to take into account the different type of status change indicating circuit 49 by the inclusion of additional input resistors 65 and 66. Also, resistor 454 is half the value of resistor 54 in FIG. 3 so as to supply two units of current for a purpose more clearly understood in the following explanation.

In operation and in the absence of digital pulses in signals "A" and "B," with circuit 18 in the no-carry status, there are three units of current being drawn from circuit 450 through resistors 56, 57, and 66. Since there are only two units of current being supplied through resistor 454, the third unit of current is drawn from the base of transistor 52, thereby rendering transistor 52 fully conductive and preventing the translation of a periodic pulse in the same manner as with respect to adding circuit 10 of FIG. 3.

During the presence of digital pulses in both of signals "A" and "B," terminals 20*a* and 20*b* are positive and, therefore, no units of current are drawn through resistors 56 or 57. Circuit 18 has changed its status indication from no-carry to carry status, rendering terminal 20*c* negative, thereby drawing a unit of current through resistor 58. In changing status indication the right-hand side of the bistable circuit in circuit 18 changes from negative to positive, which change is translated through the differentiating capacitor to the left-hand input side of circuit 70 as a positive spike pulse. This positive spike causes circuit 70 to change its status, thereby developing a negative potential at terminal 20*e* and drawing a unit of current through resistor 65. A negative pulse appears at the left-hand input side of circuit 71 but has no effect thereon due to the diode input. There are now three units of current being drawn through resistors 58, 65, and 66 and only two units being supplied through resistor 454. The additional unit of current is again supplied through the base of transistor 52 and again the periodic pulse is prevented from being translated to output terminal 21. Since the periodic pulses at terminal 14 are negative pulses, the positive-going trailing edge of the pulse is translated through the differentiating capacitor as a positive spike pulse and is applied to the right-hand input side of circuit 70, thereby restoring circuit 70 to its original state and causing circuit 49 to lose its "change-in-status" indication.

In the case where circuit 18 is initially in the carry status and there is a simultaneous absence of digital pulses in signal "A" and "B," terminals 20*a* and 20*b* are negative and two units of current are individually drawn through resistors 56 and 57. As previously explained in connection with the circuit of FIG. 3, circuit 18 changes from the carry to no-carry status, thereby developing a ground potential at terminal 20*c*. The change in potential from negative to ground is translated through the differentiating capacitor as a positive pulse to the left-hand input side of bistable circuit 71 which causes circuit 71 to change its status to develop at the output thereof a ground potential whereby circuit 49 now develops a pair of ground potential control signals at terminals 20*e* and 20*f*. There being only two units of current drawn from circuit 450 and two units of current being supplied through resistor 454, no current is drawn from the base of transistor 52, thereby causing transistor 52 to be nonconductive. This, in turn, causes potential —B to be applied to AND circuit 51 which permits the translation of a periodic pulse therethrough. The trailing edge of the periodic pulse then restores circuit 49 to its neutral condition in the manner previously explained.

While there have been described what are at present considered to be the preferred embodiments of the present invention, it will be obvious to those skilled in the art that various changes and modifications may be made therein without departing from the invention and it is, therefore, aimed to cover all such changes and modifications as fall within the true spirit and scope of the invention.

What is claimed is:

1. A binary adding circuit for adding two serial signals representative of binary numbers to produce, by the translation of selected ones of a train of periodic pulses, a sum signal representative of the sum of said numbers comprising: means for supplying said serial signals; means for supply periodic pulses synchronous with the period of digital pulses in such serial signals; control means responsive to said serial signals for developing predetermined combinations of gating control signals including first means for developing a control signal of a first type during the occurrence of a digital pulse in either one of said serial signals and otherwise developing a control signal of a second type, second means for developing a control signal of said first type during the simultaneous occurrence of digital pulses in both of said serial signals and otherwise developing a control signal of said second type, carry status indicating means including a bistable circuit coupled to said first and second means for developing a control signal of said first type during a no-carry status indication and of said second type during a carry status indication, and third means coupled to said indicating means for developing a control signal effectively equivalent to said second type in response to a change from no-carry to carry status and for developing a control signal effectively equivalent to two signals of said first type in response to a change from carry to no-carry status; and gating means coupled to said periodic pulse source and responsive to said control signals for translating said periodic pulses whenever the ratio of the number of said first type control signals to said second type control signals differs in one sense from a predetermined amount.

2. A binary adding circuit for adding two serial signals representative of binary numbers to produce, by the translation of selected ones of a train of periodic pulses, a sum signal representative of the sum of said numbers comprising: means for supplying said serial signals; means for supplying periodic pulses synchronous with the period of digital pulses in such serial signals; control means responsive to said serial signals for developing predetermined combinations of gating control signals including first means for developing a control signal of a first type during the occurrence of a digital pulse in either one of said serial signals and otherwise developing a control signal of a second type, second means for developing a control signal of said first type during the simultaneous occurrence of digital pulses in both of said serial signals and otherwise developing a control signal of said second type, carry status indicating means including a bistable circuit coupled to said first and second means for developing a control signal of said first type during a no-carry status indication and of said second type during a carry status indication, and third means coupled to said indicating means for developing a control signal effectively equivalent to said second type in response to a change from no-carry to carry status and for developing a control signal effectively equivalent to two signals of said first type in response to a change from carry to no-carry status; and gating means coupled to said periodic pulse source and responsive to said control signals for translating said periodic pulses whenever the ratio of the number of said first type control signals to said second type control signals is greater than one.

3. A binary adding circuit for adding two serial signals representative of binary numbers to produce, by the translation of selected ones of a train of periodic pulses, a sum signal representative of the sum of said numbers comprising: means for supplying said serial signals; means for supplying periodic pulses synchronous with the period of digital pulses in such serial signals; control means responsive to said serial signals for developing predetermined combinations of gating control signals including first means for developing a control signal of a first type during the occurrence of a digital pulse in either one of said serial signals and otherwise developing a control signal of a second type, second means for developing a control signal of said first type during the simultaneous occurrence of digital pulses in both of said serial signals and otherwise developing a control signal of said second type, carry status indicating means including a bistable circuit coupled to said first and second means for developing a control signal of said first type during a no-carry status indication and of said second type during a carry status indication, and third means coupled to said indicating means for developing a control signal effectively equivalent to said second type in response to a change from no-carry to carry status and for developing a control signal effectively equivalent to two signals of said first type in response to a change from carry to no-carry status and for developing a control signal effectively equivalent to one of said signals of said first type in the absence of a change in status; and gating means coupled to said periodic pulse source and responsive to said control signals for translating said periodic pulses whenever the ratio of the number of said first type control signals to said second type control signals differs in one sense from a predetermined amount.

4. A binary adding circuit for adding two serial signals representative of binary numbers to produce, by the translation of selected ones of a train of periodic pulses, a sum signal representative of the sum of said numbers comprising: means for supplying said serial signals; means for supplying periodic pulses synchronous with the period of digital pulses in such serial signals; control means responsive to said serial signals for causing predetermined combinations of control current flow including first means for drawing a predetermined amount of control current except during the occurrence of a digital pulse in either one of said serial signals, second means for drawing control current of said predetermined amount except during the simultaneous occurrence of digital pulses in both of said serial signals, carry status indicating means including a bistable circuit coupled to said first and second means for drawing control current of said predetermined amount only during a carry status indication, and third means coupled to said indicating means for drawing control current at least equal to said predetermined amount in response to a change from no-carry to carry status and for supplying control current at least equal to said predetermined amount in response to a change from carry to no-carry status; and current-controlled gating means coupled to said periodic pulse source including a circuit for supplying current of said predetermined amount and coupled to said control means for normally translating said periodic pulses and for preventing the translation when the amount of current drawn from the gating means exceeds the amount of current supplied thereto.

5. A binary adding circuit for adding two serial signals representative of binary numbers to produce, by the translation of selected ones of a train of periodic pulses, a sum signal representative of the sum of said numbers comprising: means for supplying said serial signals; means for supplying periodic pulses synchronous with the period of digital pulses in such serial signals; control means responsive to said serial signals for causing predetermined combinations of control current flow including first means for normally drawing a predetermined amount of control current and for preventing such current flow only during the occurrence of a digital pulse in either one of said serial signals and otherwise developing a control signal of a second type, second means for normally drawing control current of said predetermined amount and for preventing such current flow only during the simultaneous occurrence of digital pulses in both of said serial signals, carry status indicating means including a bistable circuit coupled to said first and second means for drawing control current of said predetermined amount during a carry status indication and for preventing such current flow during a no-carry status indication, and third means coupled to said indicating means for drawing control current at least equal to said predetermined amount in response to a change from no-carry to carry status and for supplying control current at least equal to said predetermined amount in response to a change from carry to no-carry status and for preventing such current flow in the absence of a change in status indication; and gating means coupled to said periodic pulse source and responsive to said control signals for translating said periodic pulses whenever the ratio of said one type control signals to said second type control signals differs in one sense from a predetermined amount.

6. A binary adding circuit for adding two serial signals representative of binary numbers to produce, by the translation of selected ones of a train of periodic pulses, a sum signal representative of the sum of said numbers comprising: means for supplying said serial signals; means for supplying periodic pulses synchronous with the period of digital pulses in such serial signals; control means including a plurality of output connections and being responsive to said serial signals and said periodic pulses for causing current flow in equal amounts through said connections except as such current flow is varied by the following: said control means including first means for preventing current flow through a first of said connections during the occurrence of a digital pulse in either one of said serial signals, second means for preventing current flow through a second of said connections during the simultaneous occurrence of digital pulses in both of said signals, carry status indicating means including a bistable circuit coupled to said first and second means and to said periodic pulse supply means for preventing current flow through a third of said connections only during a no-carry status indication, and third means coupled to said indicating means for preventing current flow through a fourth of said connections in the absence of a change in status indication and for permitting such current flow in response to a change from no-carry to carry status and for reversing such current flow in response to a change from carry to no-carry status; and current controlled gating means responsive to said periodic pulses and to the net current flow through said connections for translating said periodic pulses except when said net current flow exceeds a predetermined amount.

7. A binary adding circuit for adding two serial signals representative of binary numbers to produce, by the translation of selected ones of a train of periodic pulses, a sum signal representative of the sum of said numbers comprising: means for supplying said serial signals; means for supplying periodic pulses synchronous with the period of digital pulses in such serial signals; control means including a plurality of output connections and being responsive to said serial signals for causing current flow in equal amounts through said connections except as such current is varied by the following: said control means including first means for preventing current flow through a first of said connections during the occurrence of a digital pulse in either one of said serial signals, second means for preventing current flow through a second of said connections during the simultaneous occurrence of digital pulses in both of said signals, carry status indicating means including a bistable circuit coupled to said first and second means for preventing current flow through a third of said connections only during a no-carry status indication, and third means including a pair of said connections and being coupled to said indicating means for preventing current flow through one of said pair of connections in the absence of a change in status indication and for permitting such current flow through both of said pair of connections in response to a change from no-carry to carry status and for preventing such current flow through both of said pair of connections in response to a change from carry to no-carry status; and current controlled gating means responsive to said periodic pulses and to the net current flow through said connections for translating said periodic pulses except when said net current flow exceeds a predetermined amount.

References Cited in the file of this patent

UNITED STATES PATENTS 2,933,253 Hallden ---------------- Apr. 19, 1960